(12) United States Patent
Murouchi et al.

(10) Patent No.: US 8,192,645 B2
(45) Date of Patent: *Jun. 5, 2012

(54) LIQUID CRYSTAL POLYESTER RESIN COMPOSITION FOR CAMERA MODULE

(75) Inventors: Satoshi Murouchi, Tokyo (JP); Toshio Nakayama, Tokyo (JP); Toru Kitai, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/933,967

(22) PCT Filed: Mar. 24, 2009

(86) PCT No.: PCT/JP2009/056410
§ 371 (c)(1),
(2), (4) Date: Dec. 2, 2010

(87) PCT Pub. No.: WO2009/119863
PCT Pub. Date: Oct. 1, 2009

(65) Prior Publication Data
US 2011/0089371 A1    Apr. 21, 2011

(30) Foreign Application Priority Data

Mar. 28, 2008  (JP) ................. 2008-087485
Mar. 28, 2008  (JP) ................. 2008-087490
Mar. 28, 2008  (JP) ................. 2008-087494

(51) Int. Cl.
| | |
|---|---|
| C09K 19/38 | (2006.01) |
| C09K 19/52 | (2006.01) |
| C09K 19/20 | (2006.01) |
| C09K 19/54 | (2006.01) |
| C08K 3/04 | (2006.01) |
| C08K 3/34 | (2006.01) |
| C08K 3/40 | (2006.01) |

(52) U.S. Cl. ........... 252/299.01; 252/299.5; 252/299.67; 524/424; 524/451; 524/493; 524/494; 524/495; 524/496

(58) Field of Classification Search ............. 252/299.01, 252/299.5, 299.67; 524/424, 451, 493, 494, 524/495; 348/374

See application file for complete search history.

(56) References Cited

U.S. PATENT DOCUMENTS

| | | | |
|---|---|---|---|
| 5,428,100 A | 6/1995 | Asai et al. | |
| 5,976,406 A | 11/1999 | Nagano et al. | |
| 6,121,369 A * | 9/2000 | Stack et al. | 524/495 |
| 6,702,955 B1 | 3/2004 | Murakami et al. | |
| 2003/0001139 A1 | 1/2003 | Nagano et al. | |
| 2003/0030031 A1 | 2/2003 | Miyashita et al. | |
| 2003/0168634 A1 | 9/2003 | Yamauchi et al. | |
| 2004/0165390 A1 | 8/2004 | Sato et al. | |
| 2006/0079614 A1* | 4/2006 | Kikuchi | 524/115 |
| 2006/0197862 A1 | 9/2006 | Lung | |
| 2007/0191528 A1 | 8/2007 | Nara et al. | |
| 2011/0089371 A1* | 4/2011 | Murouchi et al. | 252/299.01 |

FOREIGN PATENT DOCUMENTS

| | | |
|---|---|---|
| JP | 4-13758 | 1/1992 |
| JP | 4-76049 | 3/1992 |
| JP | 6-38520 | 2/1994 |
| JP | 6-207083 | 7/1994 |
| JP | 8-302172 | 11/1996 |
| JP | 10-219085 | 8/1998 |
| JP | 2000-178443 | 6/2000 |
| JP | 2000-339665 | 12/2000 |
| JP | 2001-207054 | 7/2001 |
| JP | 2002-294038 | 10/2002 |
| JP | 2003-128893 | 5/2003 |
| JP | 2003-246923 | 9/2003 |
| JP | 2004-256629 | 9/2004 |
| JP | 2004-256673 | 9/2004 |
| JP | 2006-246461 | 9/2006 |
| JP | 2007-182505 | 7/2007 |
| JP | 2008-28838 | 2/2008 |
| JP | 2008-34453 | 2/2008 |
| WO | WO 2005/017028 | 2/2005 |

* cited by examiner

*Primary Examiner* — Shean Wu
(74) *Attorney, Agent, or Firm* — Weingarten, Schurgin, Gagnebin & Lebovici LLP

(57) ABSTRACT

A resin composition for surface-mountable (SMT) camera modules which is excellent in the balance between heat resistance, rigidity, strength or moldability and surface exfoliation characteristics is provided by using a liquid-crystal polyester resin composition which comprises 100 parts by mass of a liquid-crystal polyester, 15 to 60 parts by mass of talc having a number-mean particle diameter of 10 to 50 μm, 25 to 50 parts by mass of glass fiber having a number-mean fiber length of 100 to 200 μm, 6 to 20 parts by mass of titanium oxide, and 2 to 10 parts by mass of carbon black and which exhibits a melt viscosity of 10 to 100 Pa S as determined at a shear rate of 100 sec$^{-1}$ and 370° C. and a deflection temperature under load of 220° C. or above.

17 Claims, No Drawings

LIQUID CRYSTAL POLYESTER RESIN COMPOSITION FOR CAMERA MODULE

TECHNICAL FIELD

The present invention relates to a material for a camera module. More specifically, the present invention relates to a liquid crystal polyester resin composition used for all of the plastic parts which can, during a production step or during use, produce dust that can land on a CMOS (image sensor), and includes, for example, a "lens barrel portion" (section where the lens is placed), a "mount holder portion" (section in which the barrel is mounted and which is fixed to the substrate), as well as a "CMOS (image sensor) frame," and a "shutter and a shutter bobbin portion." These portions have a high heat resistance, can withstand solder reflow, and can be surface mounted (a technology in which a material is placed on a substrate coated with a solder paste by printing and the like, and the solder melts by a reflow furnace and is fixed to the substrate. Also referred to as surface mount technology, abbreviated as "SMT").

BACKGROUND ART

When transmitting AV information in digital form, there is a camera module which is an important device used for the input and output of the information. Camera modules are mounted on mobile phones, laptop computers, digital cameras, digital video cameras and the like. For its photographing functions, a camera module may have a static still photographing function, as well as a dynamic monitoring function (for example, a rear monitor in an automobile etc.).

Until now, the plastic lenses of camera modules mounted on mobile phones have not been able to withstand solder reflow, which has prevented camera modules from being surface mounted as a whole unit. Therefore, the assembly step onto a substrate has either been carried out by surface mounting the module parts other than the lens portion, and then mounting the lens, or by assembling the whole camera module and mounting the camera module on the substrate by some other method.

Recently, inexpensive plastic lenses which are capable of withstanding solder reflow have been developed, giving rise to an environment in which surface mounting of the whole camera module can be carried out. Accordingly, liquid crystal polymers which have a high heat resistance and which can be molded in thinner wall thickness are now being used for the "lens barrel portion" (section where the lens is placed), the "mount holder portion" (section in which the barrel is mounted and which is fixed to the substrate), the "CMOS (image sensor) frame," and the "shutter and shutter bobbin portion" (refer to Patent Document 1).

For a typical camera module mounted with a fixed focus optical system, a CMOS (image sensor) has a structure in which a multilayer chip is mounted on a signal processing chip. In the assembly step of the CMOS, manual focus adjustment of the optical parts system becomes necessary (adjustment for optimizing the focus distance by threadedly moving the lens barrel portion screwed on a mount holder portion by a screw and by changing the distance between the lens and the image sensor) (Patent Document 1). However, for conventional liquid crystal polymer compositions, in this focus adjustment step, powders (particles) composed of the resin composition exfoliate from the lens barrel, the portions where both the mount holder and lens barrel wear against each other during screwing, and the surfaces of both molded articles during the threaded movement of the lens barrel portion. These powders land on the CMOS (image sensor) or on an (IR cutting) filter, thereby become one of large causes to induce image defects. Powder exfoliation can also occur during use of a product in which these members are built. Therefore, as the material used for the lens barrel portion, mount holder portion, CMOS (image sensor) frame, shutter, shutter bobbin portion and the like of camera modules, there is a need to provide a liquid crystal polyester composition having a low level of powder (particle) exfoliation.

As the material used for the above-described camera module part, although several further examples using a liquid crystal polymer can be cited in addition to Patent Document 1 (Patent Documents 2 and 3), none of these examples touches on a method for controlling the occurrence of powders (particles) during the assembly step as described above, or on the development of a resin composition in which there is little occurrence of powder (particle) exfoliation.

Conventionally, it is known to add talc to improve the anisotropy, warpage, and heat resistance of a liquid crystal polyester resin molded article (for example, refer to Patent Documents 4 to 6). Although there are also documents which discuss the surface appearance of such a molded article (refer to Patent Document 7), the documents are completely silent about a resin composition having such strict surface transferability—reducing as much as possible the occurrence of exfoliations of (from) the surface—of a molded article as in the present usages.

Furthermore, conventionally, to improve the mechanical properties, anisotropy, warpage, and heat resistance of a liquid crystal polyester resin, it is known to add a plate-like substance such as talc and a fibrous substance such as a glass fiber. Although strength and elastic modulus improve by adding a fibrous substance such as a glass fiber, there is the drawback that the effect of an improvement in anisotropy is small. Although anisotropy improves by adding a plate-like substance such as talc, there is the drawback that the effects of an improvement in the strength and elastic modulus are small. Therefore, attempts are being made to improve the balance between strength and elastic modulus, anisotropy and the like by adding the fibrous substance such as a glass fiber and the plate-like substance such as talc in various combinations (for example, refer to Patent Documents 8 to 12).

In addition, although there are documents which discuss using titanium oxide as a white pigment in a liquid crystal polyester resin used for a reflection plate made from resin to improve the reflectivity, dimensional stability against heat, and color phase stability thereof (for example, Patent Documents 13 to 15), the number of patent documents which evaluate and describe in the examples titanium oxide as a filler is surprisingly low (although there are many cases which describe titanium oxide as a common filler for a liquid crystal polyester resin). About the only case which catches the eye is a case (refer to Patent Document 16) which attempts to suppress contamination of the mold during molding and a decrease in glossiness of a surface of a molded article by adding a small amount of surface-treated titanium oxide. However, knowledge concerning a preferred plate-like substance such as talc, fibrous substance such as a glass fiber, and titanium oxide to maintain and improve a good balance between strength and elastic modulus, anisotropy and the like is yet to be attained concerning the production of a resin composition having such strict surface transferability—reducing as much as possible the occurrence of exfoliations of (from) the surface—of the molded article according to the present usages by further adding titanium oxide to a liquid crystal polyester resin which is compounded from a mixture of talc, a glass fiber and the like.

Patent Document 1: Japanese Patent Application Laid-Open No. 2006-246461
Patent Document 2: Japanese Patent Application Laid-Open No. 2008-028838
Patent Document 3: Japanese Patent Application Laid-Open No. 2008-034453
Patent Document 4: Japanese Patent Application Laid-Open No. Hei 04-13758
Patent Document 5: Japanese Patent Application Laid-Open No. 2001-207054
Patent Document 6: Japanese Patent Application Laid-Open No. Hei 06-207083
Patent Document 7: Japanese Patent Application Laid-Open No. 2003-128893
Patent Document 8: Japanese Patent Application Laid-Open No. Hei 04-76049
Patent Document 9: Japanese Patent Application Laid-Open No. Hei 10-219085
Patent Document 10: Japanese Patent Application Laid-Open No. 2000-178443
Patent Document 11: Japanese Patent Application Laid-Open No. 2002-294038
Patent Document 12: Japanese Patent Application Laid-Open No. 2003-246923
Patent Document 13: Japanese Examined Patent Application Publication No. Hei 06-38520
Patent Document 14: Japanese Patent Application Laid-Open No. 2004-256673
Patent Document 15: Japanese Patent Application Laid-Open No. 2007-182505
Patent Document 16: Japanese Patent Application Laid-Open No. Hei 08-302172

DISCLOSURE OF THE INVENTION

Thus, for a lens barrel part, mount holder part and the like of a camera module formed from a conventional liquid crystal polymer resin composition, it is currently impossible to control the occurrence of powders (particles), which are a cause in reducing product pass rates and product performance, during a camera module assembly step and during use, while maintaining the rigidity, heat resistance, thin-wall workability, and mechanical strength as good physical properties of the liquid crystal polymer resin composition.

The present invention is directed to resolving such serious problems which currently remain unresolved. It is an object of the present invention to provide a molding material formed from a liquid crystal polyester resin composition suited for a camera module part, which has a good balance among rigidity, heat resistance, thin-wall workability, and mechanical strength. Further, this molding material has a low level of powder (particle) occurrence during a camera module assembly step or during use.

To resolve the above-described problems, as a result of various investigations, the present inventors discovered that a material which has excellent surface transferability of an injection molded article and which scarcely produces any surface exfoliations during assembly or during use of the module can be obtained by combining a specific amount of a talc having a specific particle size, a specific amount of a specific glass fiber, and a specific amount of titanium oxide with a liquid crystal polyester having a viscosity in a specific range. Furthermore, the present inventors discovered that a camera module part formed from this composition has a low level of dust occurrence during an assembly step and a sufficient mechanical strength even at a weld portion, and reached the present invention.

A first aspect of the present invention relates to a liquid crystal polyester resin composition for a camera module, characterized by comprising, based on 100 parts by mass of a liquid crystal polyester, 50 to 110 parts by mass of talc having a number average particle size of 10 to 50 μm, and 2 to 10 parts by mass of carbon black, wherein a deflection temperature under load is 220° C. or more and a melt viscosity at a shear rate of 100 $sec^{-1}$ at 370° C. is 10 to 150 Pa·S.

A second aspect of the present invention relates to the liquid crystal polyester resin composition according to claim 1, characterized in that when the resin composition according to the first aspect of the present invention is molded by injection molding, a number of exfoliations from a surface of a resultant molded article according to the following definition is 200 or less.

Number of exfoliations=Number of particles in 10 mL of pure water having a maximum diameter in the range of 2 μm or more after subjecting 2 cylindrical injection molded articles having a threaded structure with a 0.3 mm pitch and a 0.2 mm groove depth on an inner side of a 7 mm (outer diameter)×6 mm (inner diameter)×4 mm (height) cylinder to ultrasonic cleaning for 30 seconds at a power of 40 kHz and 480 W in 266 mL of pure water.

A third aspect of the present invention relates to a liquid crystal polyester resin composition for a camera module, characterized by comprising, based on 100 parts by mass of a liquid crystal polyester, 15 to 60 parts by mass of talc having a number average particle size of 10 to 50 μm, 25 to 50 parts by mass of a glass fiber having a number average fiber length of 100 to 200 μm, and 2 to 10 parts by mass of carbon black, wherein a deflection temperature under load is 220° C. or more and a melt viscosity at a shear rate of 100 $sec^{-1}$ at 370° C. is 10 to 100 Pa·S.

A fourth aspect of the present invention relates to the liquid crystal polyester resin composition according to the third aspect of the present invention, characterized in that when the resin composition according to the third aspect of the present invention is molded by injection molding, the number of exfoliations from a surface of a resultant molded article according to the above definition is 280 or less.

A fifth aspect of the present invention relates to the liquid crystal polyester resin composition for a camera module according to the third aspect of the present invention, characterized by further comprising, based on 100 parts by mass of the liquid crystal polyester, 6 to 20 parts by mass of titanium oxide.

A sixth aspect of the present invention relates to the liquid crystal polyester resin composition according to the fifth aspect of the present invention, characterized in that when the resin composition according to the fifth aspect of the present invention is molded by injection molding, the number of exfoliations from a surface of a resultant molded article according to the above definition is 250 or less.

A seventh aspect of the present invention relates to the liquid crystal polyester resin composition according to any of the first to sixth aspects of the present invention, characterized in that when the resin composition according to any of the first to sixth aspects of the present invention is molded by injection molding, a weld strength of a resultant molded article is 30 MPa or more.

An eighth aspect of the present invention relates to a camera module part produced from the liquid crystal polyester resin composition according to any of the first to seventh aspects of the present invention by injection molding.

EFFECTS OF THE INVENTION

The molded article formed from a liquid crystal polyester resin composition according to the present invention has good rigidity, heat resistance, thin-wall workability, and mechanical strength, and also excellent surface transferability, and surface exfoliation properties. Thus, an optimum camera module part can be provided which is capable of being surface mounted (SMT) and yet has a low level of powder (particle) occurrence during an assembly step or in use.

BEST MODE FOR CARRYING OUT THE INVENTION

The liquid crystal polyester resin used in the present invention forms an anisotropic melt. Of these, a wholly aromatic liquid crystal polyester obtained by a polycondensation reaction of essentially only aromatic compounds is preferred.

Examples of the structural unit of the liquid crystal polyester resin constituting the liquid crystal polyester resin composition according to the present invention include a unit formed from the combination of an aromatic dicarboxylic acid, an aromatic diol, and an aromatic hydroxycarboxylic acid, a unit formed from heterogeneous aromatic hydroxycarboxylic acids, a unit formed from the combination of an aromatic hydroxycarboxylic acid, an aromatic dicarboxylic acid, and an aromatic diol, and a unit formed by reacting an aromatic hydroxycarboxylic acid with a polyester such as polyethylene terephthalate. Examples of specific structural units include the following.

Structural Unit Derived from an Aromatic Hydroxycarboxylic Acid:

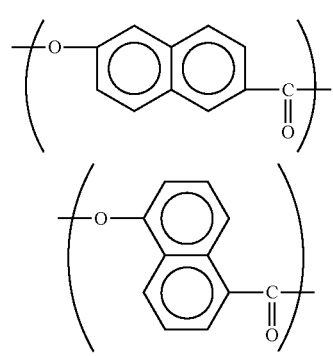

($X_1$: a halogen atom or an alkyl group)

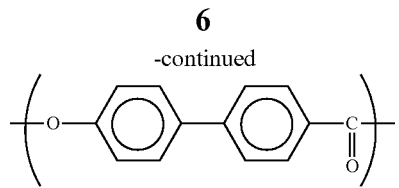

Structural Unit Derived from an Aromatic Dicarboxylic Acid:

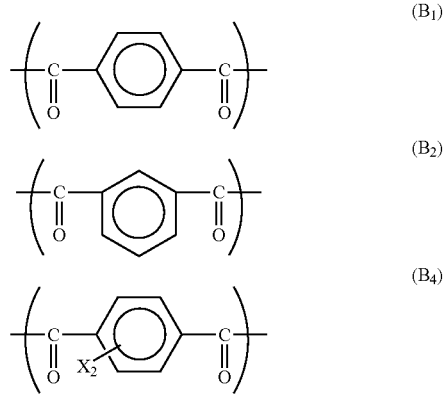

($X_2$: a halogen atom, an alkyl group, or an aryl group)

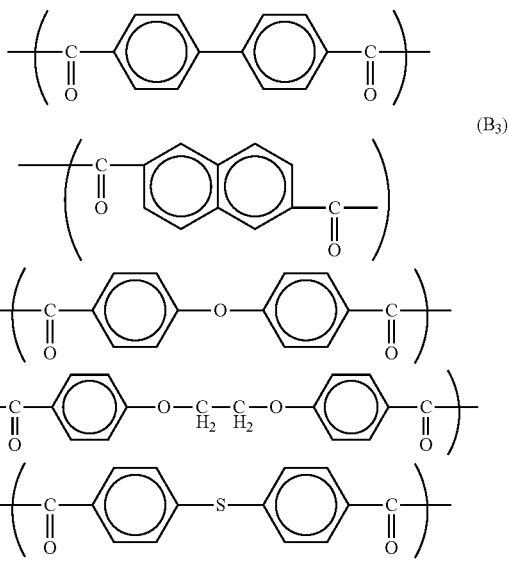

Repeating Structural Unit Derived from an Aromatic Diol:

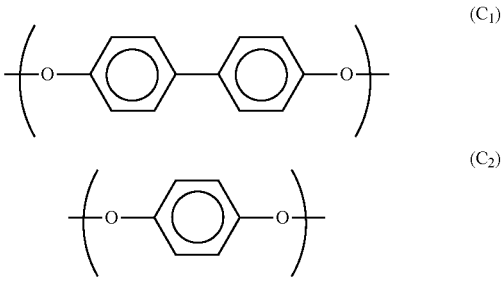

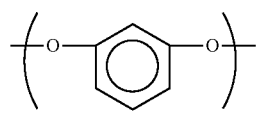
(C3)

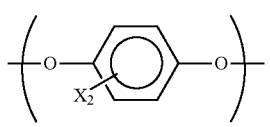
(C4)

(X$_2$: a halogen atom, an alkyl group, or an aryl group)

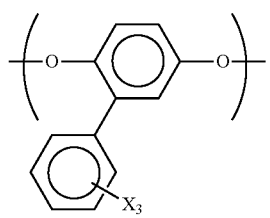

(X$_3$: H, a halogen atom, or an alkyl group)

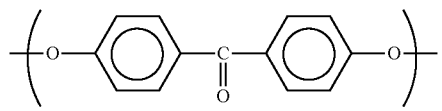

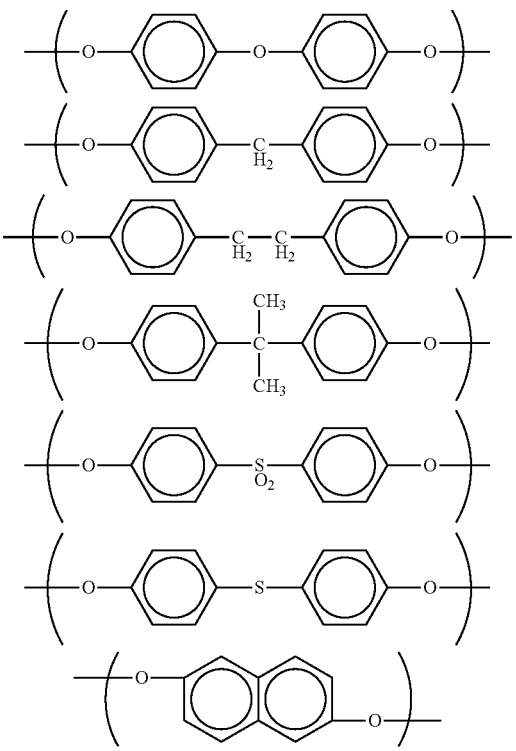

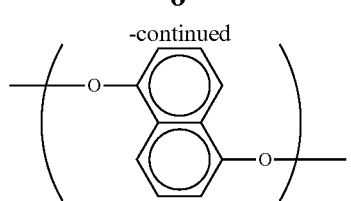

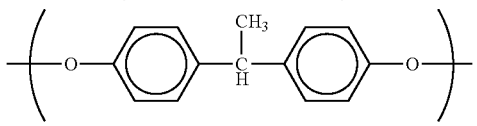

From the perspective of a balance among heat resistance, mechanical strength, and workability, a preferred liquid crystal polyester resin has 30 mol % or more of the above-described structural unit (A1), and more preferably has a total of 60 mol % or more of (A1) and (B1) combined.

An especially preferred liquid crystal polyester resin is a wholly aromatic liquid crystal polyester having a melting point of 320° C. or more, which is formed by polycondensation of 80 to 100 mol % of (I) p-hydroxybenzoic acid, (II) terephthalic acid, and (III) 4,4'-dihydroxybiphenyl (including derivatives thereof) (wherein the total of (I) and (II) is 60 mol % or more), and 0 to 20 mol % of another aromatic compound capable of performing a decondensation reaction with any of (I), (II), and (III). Alternatively, another especially preferred liquid crystal polyester resin is a wholly aromatic liquid crystal polyester having a melting point of 320° C. or more, which is formed by polycondensation of 90 to 99 mol % of (I) p-hydroxybenzoic acid, (II) terephthalic acid, and (III) 4,4'-dihydroxybiphenyl (including the repeating units of (A3), (B4), and (C3), which are derivatives thereof) (wherein the total of (I) and (II) is 60 mol % or more), and 1 to 10 mol % of another aromatic compound capable of performing a decondensation reaction with any of (I), (II), and (III) (wherein the combined total of both components is 100 mol %).

Preferred examples of the above-described structural unit combinations include:
(A1)
(A1), (B1), (C1)
(A1), (B1), (B2), (C1)
(A1), (B1), (B2), (C2)
(A1), (B1), (B3), (C1)
(A1), (B1), (B3), (C2)
(A1), (B1), (B2), (C1), (C2) and
(A1), (A2), (B1), (C1).

An especially preferred monomer composition ratio in a wholly aromatic liquid crystal polyester resin is 80 to 100 mol % of p-hydroxybenzoic acid, terephthalic acid, and 4,4'-dihydroxybiphenyl (including the repeating units of (A3), (B4), and (C3), which are derivatives thereof) and 0 to 20 mol % of an aromatic compound selected from the group consisting of an aromatic diol, an aromatic hydroxycarboxylic acid, and an aromatic dicarboxylic acid other than these (wherein the combined total of both components is 100 mol %). If the total of p-hydroxybenzoic acid, terephthalic acid, and 4,4'-dihydroxybiphenyl is less than 80 mol %, heat resistance tends to deteriorate, which is not preferable.

A publicly known method may be employed as the method for producing the liquid crystal polyester resin used in the present invention. For example, a production method carried out only by melt polymerization, or a production method carried out by two-step polymerization of melt polymerization and solid phase polymerization may be employed. A specific example thereof is to charge a monomer selected from an aromatic dihydroxy compound, an aromatic hydroxycarboxylic acid compound, and an aromatic dicarboxylic acid compound into a reactor, add acetic anhydride to acetylize a hydroxyl group of the monomers, and then carry out an acetic acid-removing polycondensation reaction. For example, the polyester resin is produced by charging p-hydroxybenzoic acid, terephthalic acid, isophthalic acid, and 4,4'-dihydroxybiphenyl into a reactor under a nitrogen atmosphere, add acetic anhydride to form an acetoxy under acetic anhydride reflux, then increase the temperature to carry out acetic acid-removing melt polycondensation while distilling off the acetic acid in a temperature range of 150 to 350° C. The polymerization time can be selected in the range of 1 hour to several tens of hours. In the production of the liquid crystal polyester resin used in the present invention, the monomer may optionally be dried before production.

When carrying out solid-phase polymerization on a polymer obtained by melt polymerization, it is preferred to select a method in which the polymer obtained by melt polymerization is solidified and then pulverized to form a powdery or flake-like polymer, followed by performing a publicly known solid-phase polymerization method, for example, by performing a heat treatment for 1 to 30 hours in a temperature range of 200 to 350° C. under an inert atmosphere such as nitrogen. The solid-phase polymerization may be carried out while stirring or in a still state without any stirring.

A catalyst can optionally be used in the polymerization reaction. Catalysts conventionally known as a polyester polycondensation catalyst may be used for the catalyst to be used. Examples include metal salt catalysts such as magnesium acetate, tin(I) acetate, tetrabutyl titanate, lead acetate, sodium acetate, potassium acetate, and antimony trioxide, and organic compound catalysts such as N-methylimidazole.

The polymerization reaction apparatus for the melt polymerization is not especially limited. However, it is preferred to use a reaction apparatus that is commonly used in reactions of high viscosity fluids. Examples of such a reaction apparatus include a stirring tank type polymerization reaction apparatus having a stirring device which has a variously shaped stirring blade, such as an anchor type, a multistage type, a spiral-ribbon type, a screw shaft type and the like, or a modified shape thereof. Further examples of such a reaction apparatus include a mixing apparatus commonly used in resin kneading, such as a kneader, a roll mill, a Banbury mixer and the like.

The liquid crystal polyester resin used in the present invention may be in the form of a powder, granules, or a pellet. However, from the perspective of dispersibility during mixing with the filler material, a powder or granule form is preferred.

<Concerning the Talc>

The talc used in the present invention is not subject to any special restrictions in terms of its chemical composition, as long as it is a publicly known talc used as a material for forming a resin composition.

However, although the theoretical chemical structure is hydrous magnesium silicate, especially if the talc is a natural product, impurities such as iron oxide and aluminum oxide may be contained. As the talc used in the present invention, talc having a total level of impurities of less than 10 mass % is preferred.

In the present invention, a scaly, smooth physical shape is thought to contribute to the balance in properties relating to rigidity and low abrasion performance. However, this balance can be most effectively exhibited when the number average particle size as determined by laser diffraction is in the range of 10 to 50 μm. If the number average particle size is less than 10 μm, handling during compounding becomes difficult, and the number of exfoliations from the surface of the molded article increases. Further, if the number average particle size is more than 50 μm, dispersibility in the molded article deteriorates and the surface of the molded article becomes rougher, so that the number of exfoliations from the surface of the molded article increases. Therefore, it is preferred that the average particle size is 10 to 50 μm.

When preparing the resin composition according to the first aspect of the present invention, in which talc is added as an essential filler material, it is preferred that the added amount of the talc is in the range of 50 to 110 parts by mass based on 100 parts by mass of the liquid crystal polyester. If the added amount of the talc is more than 110 parts by mass, the strength and the impact resistance of the composition according to the present invention deteriorate. Furthermore, if the added amount of the talc is less than 50 parts by mass, the addition effect is insufficient. Consequently, the object of the present invention, which is to reduce exfoliations from the surface of the molded article due to an improvement in surface transferability, cannot be achieved.

When preparing the resin compositions according to the third and fifth aspects of the present invention, in which talc and a glass fiber are both added as essential filler materials, although it depends on the balance with the glass fiber added amount, the added amount of the talc is preferably in the range of 15 to 60 parts by mass based on 100 parts by mass of the liquid crystal polyester. If the added amount of the talc is more than 60 parts by mass, the strength and the impact resistance of the composition according to the present invention may deteriorate. Furthermore, if the added amount of the talc is less than 15 parts by mass, the addition effect is insufficient. Consequently, the object of the present invention, which is to reduce exfoliations from the surface of the molded article due to an improvement in surface transferability, cannot be achieved.

<Concerning the Glass Fiber>

The glass fiber used in the resin compositions according to the third and fifth aspects of the present invention is a publicly known glass fiber used as a material for forming a resin composition. Although the number average fiber diameter of the glass fiber is not especially limited, the number average fiber diameter is preferably more than 8 μm, and the number average fiber length is preferably 100 to 200 μm. Although it depends on the balance with the talc added amount, if the number average fiber length is 100 μm or more, strength and elastic modulus can be improved with just a comparatively small amount. Therefore, in the case of the present invention, in which both talc and a glass fiber are added as essential materials, the dispersibility in the resultant molded article is uniform, and thus the number average fiber length is preferably 100 μm or more. However, if the number average fiber length is more than 200 μm, the surface of the molded article becomes rougher. Consequently, the object of the present invention, which is to reduce exfoliations from the surface of the molded article due to an improvement in surface transferability, cannot be achieved. In addition, the effects of an improvement in fluidity and heat resistance are also insufficient.

When preparing the resin compositions according to the third and fifth aspects of the present invention, in which talc and a glass fiber are both added as essential filler materials, although it depends on the balance with the talc added amount, the added amount of the glass fiber is preferably in the range of 25 to 50 parts by mass based on 100 parts by mass of the liquid crystal polyester. If the added amount of the glass fiber is less than 25 parts by mass, the effects of an improvement in strength and heat resistance are insufficient. If the added amount of the glass fiber is more than 50 parts by mass, the surface of the molded article becomes rougher. Consequently, the object of the present invention, which is to reduce exfoliations from the surface of the molded article due to an improvement in surface transferability, cannot be achieved.

<Concerning the Titanium Oxide>

The titanium oxide used in the fifth aspect of the present invention is $TiO_2$, which is widely used as a white pigment. The titanium oxide is preferably a rutile type that is stable at high temperatures. The number average particle size is preferably 0.1 to 0.5 μm. Furthermore, a titanium oxide which has been surface treated with a hydrous oxide of Al, Si and the like may also be used.

In the case of the resin composition according to the fifth aspect of the present invention, in which talc, a glass fiber, and titanium oxide are all added as essential materials, although it depends on the balance with the talc and the glass fiber added amounts, the added amount of the titanium oxide is preferably in the range of 6 to 20 parts by mass based on 100 parts by mass of the liquid crystal polyester. If the added amount of the titanium oxide is less than 6 parts by mass, the effect of a reduction in the number of exfoliations from the surface of the molded article due to an improvement in surface transferability decreases. If the added amount of the titanium oxide is more than 20 parts by mass, fluidity deteriorates.

<Concerning the Carbon Black>

The carbon black used in the present invention is not especially limited, as long as it is a generally commercially available carbon black used for resin coloration. If the primary particle size of the carbon black is less than 20 nm, the surface of the obtained molded article tends to become rougher due to the formation of a large number of "protrusions" (fine pimply protrusions of agglomerated carbon black) on the surface of the molded article, which is not preferred.

The added amount of the carbon black is preferably in the range of 2 to 10 parts by mass based on 100 parts by mass of the liquid crystal polyester. If the added amount of the carbon black is less than 2 parts by mass, the jet-black quality of the obtained resin composition deteriorates, and the light shielding properties may become insufficient. A carbon black added amount of more than 10 parts by mass is uneconomic and increases a possibility of the "protrusions" occurrence.

Further, to the extent that the object of the present invention is not hindered, a typical additive or another thermoplastic resin may be added to the composition according to the present invention to confer a specific property. Examples of such an additive includes an antioxidant and a heat stabilizer (for example, a hindered phenol, hydroquinone, phosphites, and derivatives thereof etc.), a UV absorber (for example, resorcinol, salicylate, benzotriazole, and benzophenone etc.), a lubricant and a release agent (montanic acid and a salt, ester and half ester thereof, stearyl alcohol, stearamide, polyethylene wax etc.), a plasticizer, an antistatic agent, and a flame retardant.

The liquid crystal polyester resin composition according to the present invention can be obtained by melting the liquid crystal polyester and kneading it with other components. The equipment and the operation method used for the melt kneading are not especially limited, as long as they are generally used in melt kneading of liquid crystal polyesters. A preferred method is, using an extruder having a pair of screws, to charge the liquid crystal polyester, talc, and (pellet-form) carbon black from a hopper, melt-knead the resultant mixture, and extrude the mixture to form a pellet. This extruder is called a "twin-screw extruder." Among such extruders, it is preferred to use a counter-rotation type extruder which has a switching mechanism that allows uniform dispersion of the filler, and an extruder having a cylinder diameter with a large space between the barrel and the screws of 40 mm φ or more that facilitates screw feeding into the mixture. Further preferred examples include an extruder having double-thread screw, and an extruder having a larger gearing between the screws, specifically, a gearing ratio of 1.45 or more.

<Concerning the Melt Viscosity Range>

In the present invention, the melt viscosity of the thus-obtained liquid crystal polyester resin composition measured at a shear rate of 100 $sec^{-1}$ at 370° C. needs to be in the range of 10 to 100 (Pa·S). This is because if the melt viscosity is outside of this range, the surface quality of the injection molded article deteriorates, and the number of exfoliations increases.

The melt viscosity is determined as the apparent viscosity at 370° C. by measuring the apparent viscosity while heating at a constant temperature rate increase of +4° C./minute from 320° C. at a shear rate of 100 $sec^{-1}$ using a capillary rheometer manufactured by Intesco Co., Ltd. (Model 2010) and also using a capillary die having a diameter of 1.00 mm, a length of 40 mm, and an inflow angle of 90°.

<Concerning the Deflection Temperature Under Load>

In the present invention, the deflection temperature under load of an injection molded article of the thus-obtained liquid crystal polyester resin composition needs to be 220° C. or more. Here, "deflection temperature under load" means the deflection temperature under load (DTUL) measured in accordance with ASTM D648. This is because if the deflection temperature under load is outside of this range, problems can occur with heat resistance during solder reflow in surface mounting.

The part for a camera module according to the present invention can be obtained from the above-described composition by injection molding. However, to realize the desired rigidity and sliding performance of the molded article, the melt viscosity must be in the above-described range.

If the minimum thickness of the part is a thin wall of about 0.2 to 0.8 mm, by using a resin composition having a melt viscosity in the above-described range, when the composition is injected and filled into a space having a thickness of 0.2 to 0.8 mm in the mold at high speed, the composition uniformly flows into the mold, whereby a molded article with uniform composition can be obtained. The thus-obtained part for a camera module has excellent mechanical strength and rigidity, and has a suppressed level of exfoliations from the surface of the molded article. Furthermore, to realize the desired solder reflow performance in the molded article, the deflection temperature under load must also be in the above-described range.

The injection molding conditions and the injection molding machine used in the present invention are not especially limited, as long as they are publicly known and typically used in the molding of a liquid crystal polyester.

EXAMPLES

The present invention will now be described in more detail using the following examples and comparative examples. However, the present invention is not limited to these examples.

(Testing Methods)

The methods for measuring and evaluating the performance of the thermotropic liquid crystal polyester resin composition in the examples and comparative examples and the molded articles obtained therefrom are illustrated below.

(1) Measurement of Melt Viscosity

The melt viscosity of the thermotropic liquid crystal polyester resin composition was determined as the apparent viscosity at 370° C. by measuring the apparent viscosity while heating at a constant temperature increase rate of +4° C./minute from 300° C. at a shear rate of 100 sec$^{-1}$ using a capillary rheometer manufactured by Intesco Co., Ltd. (Model 2010) and also using a capillary die having a diameter of 1.00 mm, a length of 40 mm, and an inflow angle of 90°. The obtained value was taken as the test value. In the testing, a resin composition dried in advance for 4 hours at 150° C. in an air oven was used.

(2) Measurement of Weld Strength

A pellet of the obtained resin composition was injection molded at a cylinder maximum temperature of 370° C., an injection speed of 300 mm/sec, and a mold temperature of 80° C. using an injection molding machine (UH-1000, Nissei Plastic Industrial Co., Ltd.) to obtain a 13 mm (width)×80 mm (length)×1.0 mm (thickness) injection molded article having a weld in a center portion. This injection molded article was used as a test piece for weld portion strength measurement. The bending strength of the weld portion for each test piece was measured in accordance with ASTM D790 at a support span of 25 mm.

(3) Measurement of Deflection Temperature Under Load (DTUL)

A pellet of the obtained resin composition was injection molded using an injection molding machine (SG-25, Sumitomo Heavy Industries Ltd.) at a cylinder maximum temperature of 370° C., an injection speed of 100 mm/sec, and a mold temperature of 80° C. to produce a 13 mm (width)×130 mm (length)×3 mm (thickness) injection molded article, which was used as a test piece for deflection temperature under load measurement. The deflection temperature under load for each test piece was measured in accordance with ASTM D648.

(4) Measurement of Number of Exfoliations

A pellet of the obtained resin composition was injection molded using an injection molding machine (UH-1000, Nissei Plastic Industrial Co., Ltd.) at a cylinder maximum temperature of 370° C., an injection speed of 300 mm/sec, and a mold temperature of 80° C. to produce a cylindrical injection molded article (called a "carrier") having a threaded structure with a 0.3 mm pitch and a 0.2 mm groove depth on an inner side of a 7 mm (outer diameter)×6 mm (inner diameter)×4 mm (height) cylinder. The cylindrical injection molded article was used as a test piece for measurement of the number of exfoliations. Two of these test pieces were put in 266 mL of pure water, and subjected to ultrasonic cleaning for 30 seconds at a power of 40 kHz and 480 W. Of the exfoliations included in 10 mL of pure water after the ultrasonic cleaning, the number of exfoliations having a maximum diameter in the range of 2 μm or more was measured using a SURFEX 200 manufactured by Nitta Corporation. The average value of three measurements was taken as the measurement result.

A production example of the liquid crystal polyester (LCP) is illustrated below.

Production Example

Production of Thermotropic Liquid Crystal Polyester A

A polymerization tank (manufactured by Kobe Steel Ltd.) with an internal capacity of 1700 L made from SUS 316 and having a double-helical stirring blade was charged with 298 kg (2.16 kilomoles) of p-hydroxybenzoic acid (manufactured by Ueno Fine Chemicals Industry Ltd.), 134 kg (0.72 kilomoles) of 4,4'-dihydroxybiphenyl (manufactured by Honshu Chemical Industry Co., Ltd.), 90 kg (0.54 kilomoles) of terephthalic acid (manufactured by Mitsui Chemical Inc.), 30 kg (0.18 kilomoles) of isophthalic acid (manufactured by A.G. International Chemical Co., Inc.), and as a catalyst 0.04 kg of potassium acetate (manufactured by Kishida Chemical Co., Ltd.) and 0.10 kg of magnesium acetate (manufactured by Kishida Chemical Co., Ltd.). The polymerization tank was purged with nitrogen by twice injecting nitrogen under vacuum, and then charged with 386 kg (3.78 kilomoles) of acetic anhydride. The temperature was increased to 150° C. over 1.5 hours at stirring blade revolution speed of 45 rpm, an acetylation reaction was then carried out for 2 hours under a reflux state. After the acetylation reaction was finished, while the acetic acid was being distilled off, the temperature was increased by 0.5° C./min. When the reactor temperature reached 305° C., the polymerization product was extracted from an extraction port at a lower portion of the reactor, cooled and solidified by a cooling apparatus. The obtained polymerization product was pulverized to a size which would pass through a sieve having 2.0 mm apertures by a pulverizing machine manufactured by Hosokawa Micron Corporation to obtain a pre-polymer.

The obtained pre-polymer was subjected to solid-phase polymerization using a rotary kiln manufactured by Takasago Industry Co., Ltd. The pre-polymer was placed in the kiln. The pre-polymer was then held for 10 hours at a rotation speed of 2 rpm under a nitrogen flow with a flow rate of 16 Nm$^3$/hr while increasing the heater temperature over 1 hour from room temperature to 350° C. It was confirmed that the resin powder temperature in the kiln had reached 295° C., and then the heating was stopped. The resin powder was cooled over 4 hours while rotating the kiln to obtain a powdery liquid crystal polyester, which had a melting point of 360° C. and a melt viscosity of 70 Pa·S.

Production Example

Production of Thermotropic Liquid Crystal Polyester B

A pre-polymer was obtained by the same method as for the thermotropic liquid crystal polyester A.

The obtained pre-polymer was subjected to solid-phase polymerization using a rotary kiln manufactured by Takasago Industry Co., Ltd. The pre-polymer was placed in the kiln. The pre-polymer was then held for 9 hours at a rotation speed of 2 rpm under a nitrogen flow at a flow rate of 16 Nm$^3$/hr while increasing the heater temperature over 1 hour from room temperature to 350° C. It was confirmed that the resin powder temperature in the kiln had reached 290° C., and then the heating was stopped. The resin powder was cooled over 4 hours while rotating the kiln to obtain a powdery liquid crystal polyester, which had a melting point of 350° C. and a melt viscosity of 20 Pa·S.

Production Example

Production of Thermotropic Liquid Crystal Polyester C

A pre-polymer was obtained by the same method as for the thermotropic liquid crystal polyester A.

The obtained pre-polymer was subjected to solid-phase polymerization using a rotary kiln manufactured by Takasago Industry Co., Ltd. The pre-polymer was placed in the kiln. The pre-polymer was then held for 11 hours at a rotation speed of 2 rpm under a nitrogen flow at a flow rate of 16 Nm³/hr while increasing the heater temperature over 1 hour from room temperature to 350° C. It was confirmed that the resin powder temperature in the kiln had reached 300° C., and then the heating was stopped. The resin powder was cooled over 4 hours while rotating the kiln to obtain a powdery liquid crystal polyester, which had a melting point of 370° C. and a melt viscosity of 140 Pa·S.

The inorganic fillers used in the following examples are shown below.
(1) Talc A: "MS-KY" manufactured by Nippon Talc Co., Ltd., (number average particle size 23 μm).

obtained pellet, the various physical properties were measured by the above-described testing methods. The results are shown in Table 1.

Examples 2 and 3, and Comparative Examples 1 to 5

A pellet of each liquid crystal polyester resin composition was produced in the same manner as in Example 1 using the same equipment and operation methods as in Example 1, except that the composition of the powdery liquid crystal polyester, talc, and carbon black was changed to those shown in Table 1. Using the pellets obtained in the same manner as in Example 1, the various physical properties were measured by the above-described testing methods. The results are shown in Table 1.

TABLE 1

|  | LCP(parts by mass) | | | Talc (parts by mass) | | CB(parts by mass) | Weld Strength (MPa) | DTUL (° C.) | Viscosity Pa·S | No. of Exfoliations (pcs/10 ml) |
| --- | --- | --- | --- | --- | --- | --- | --- | --- | --- | --- |
|  | A | B | C | A | B |  |  |  |  |  |
| Example 1 | 100 |  |  | 69 |  | 3 | 28 | 260 | 70 | 150 |
| Example 2 | 100 |  |  | 56 |  | 3 | 30 | 270 | 50 | 140 |
| Example 3 | 100 |  |  | 104 |  | 4 | 25 | 235 | 120 | 160 |
| Comp. Example 1 | 100 |  |  | 26 |  | 3 | 32 | 275 | 40 | 200 |
| Comp. Example 2 | 100 |  |  | 128 |  | 5 | 22 | 210 | 160 | 220 |
| Comp. Example 3 |  | 100 |  | 69 |  | 3 | 28 | 215 | 20 | 250 |
| Comp. Example 4 |  |  | 100 | 69 |  | 3 | 28 | 270 | 220 | 350 |
| Comp. Example 5 | 100 |  |  |  | 69 | 3 | 27 | 260 | 200 | 230 |

(2) Talc B: "5000S" manufactured by Hayashi-Kasei Co., Ltd., (number average particle size 4 μm).
(3) Glass fiber (GF) A: PF100E-001SC manufactured by Nitto Boseki Co., Ltd., (number average fiber length 100 μm, number average fiber diameter 10 μm).
(4) Glass fiber (GF) B: EFH150-01 manufactured by Central Glass Fiber Co., Ltd., (number average fiber length 150 μm, number average fiber diameter 10 μm).
(5) Glass fiber (GF) C: PX-1 manufactured by Owens Corning Japan Ltd., (number average fiber length 3 mm, number average fiber diameter 10 μm).
(6) Titanium oxide: D-2378 manufactured by Sakai Chemical Industry Co., Ltd., (number average particle size 0.25 μm).
(7) Carbon black (CB): "REGAL 660" manufactured by Cabot Japan K.K. (primary particle size 24 nm).

Example 1

Using a ribbon blender, 100 parts by mass of the powdery liquid crystal polyester A obtained in the above-described production example, 69 parts by mass of talc A, and 3 parts by mass of carbon black were mixed. The resultant mixture was dried for 2 hours at 150° C. in an air oven. The dried mixture was melt kneaded at an extrusion rate of 140 kg/hr using a twin-screw extruder (PCM-30, manufactured by Ikegai Co., Ltd.) having a cylinder diameter of 30 mm with the cylinder maximum temperature set to 380° C. to obtain a pellet of the intended liquid crystal polyester resin composition. Using the Example 4

Using a ribbon blender, 100 parts by mass of the powdery liquid crystal polyester A obtained in the above-described production example, 34 parts by mass of talc, 34 parts by mass of glass fiber A, and 3 parts by mass of carbon black were mixed. The resultant mixture was dried for 2 hours at 150° C. in an air oven. The dried mixture was melt kneaded at an extrusion rate of 140 kg/hr using a twin-screw extruder (PCM-30, manufactured by Ikegai Co., Ltd.) having a cylinder diameter of 30 mm with the cylinder maximum temperature set to 380° C. to obtain a pellet of the intended liquid crystal polyester resin composition. Using the obtained pellet, the various physical properties were measured by the above-described testing methods. The results are shown in Table 2

Examples 5 to 7, and Comparative Examples 6 to 11

A pellet of each liquid crystal polyester resin composition was produced in the same manner as in Example 4 using the same equipment and operation methods as in Example 4, except that the composition of the powdery liquid crystal polyester, talc, glass fiber, and carbon black was changed to those shown in Table 2. Using the pellets obtained in the same manner as in Example 4, the various physical properties were measured by the above-described testing methods. The results are shown in Table 2.

TABLE 2

| | LCP(parts by mass) | | | Talc(parts by mass) | GF(parts by mass) | | | CB (parts by mass) | Weld Strength (MPa) | DTUL (° C.) | Viscosity Pa·S | Number of Exfoliations (pcs/10 ml) |
|---|---|---|---|---|---|---|---|---|---|---|---|---|
| | A | B | C | A | A | B | C | | | | | |
| Example 4 | 100 | | | 34 | 34 | | | 3 | 35 | 270 | 60 | 260 |
| Example 5 | 100 | | | 34 | | 34 | | 3 | 37 | 270 | 60 | 270 |
| Example 6 | 100 | | | 28 | 41 | | | 3 | 36 | 273 | 55 | 275 |
| Example 7 | 100 | | | 43 | 26 | | | 3 | 33 | 265 | 65 | 230 |
| Comp. Example 6 | 100 | | | | 69 | | | 3 | 47 | 277 | 60 | 365 |
| Comp. Example 7 | 100 | | | 34 | | | 34 | 3 | 40 | 276 | 70 | 320 |
| Comp. Example 8 | 100 | | | 64 | 64 | | | 5 | 34 | 270 | 110 | 295 |
| Comp. Example 9 | 100 | | | 13 | 13 | | | 3 | 29 | 265 | 50 | 290 |
| Comp. Example 10 | 100 | | | 34 | 34 | | | 3 | 35 | 225 | 10 | 320 |
| Comp. Example 11 | 100 | | | 34 | 34 | | | 3 | 35 | 280 | 200 | 355 |

Example 8

Using a ribbon blender, 100 parts by mass of the powdery liquid crystal polyester A obtained in the above-described production example, 26 parts by mass of talc, 34 parts by mass of glass fiber A, 9 parts by mass of titanium oxide, and 3 parts by mass of carbon black were mixed. The resultant mixture was dried for 2 hours at 150° C. in an air oven. The dried mixture was melt kneaded at an extrusion rate of 140 kg/hr using a twin-screw extruder (PCM-30, manufactured by Ikegai Co., Ltd.) having a cylinder diameter of 30 mm with the cylinder maximum temperature set to 380° C. to obtain a pellet of the intended liquid crystal polyester resin composition. Using the obtained pellet, the various physical properties were measured by the above-described testing methods. The results are shown in Table 3.

Examples 9 to 12, and Comparative Examples 12 to 15

A pellet of each liquid crystal polyester resin composition was produced in the same manner as in Example 8 using the same equipment and operation methods as in Example 8, except that the composition of the powdery liquid crystal polyester, talc, glass fiber, titanium oxide, and carbon black was changed to those shown in Table 3. Using the pellets obtained in the same manner as in Example 8, the various physical properties were measured by the above-described testing methods. The results are shown in Table 3.

TABLE 3

| | LCP(parts by mass) | | | Talc(parts by mass) | GF(parts by mass) | TiO2(parts by mass) | CB(parts by mass) | Weld Strength (MPa) | DTUL (° C.) | Viscosity Pa·S | Number of Exfoliations (pcs/10 ml) |
|---|---|---|---|---|---|---|---|---|---|---|---|
| | A | B | C | A | A | | | | | | |
| Example 8 | 100 | | | 26 | 34 | 9 | 3 | 34 | 268 | 80 | 225 |
| Example 9 | 100 | | | 28 | 34 | 7 | 3 | 34 | 269 | 70 | 230 |
| Example 10 | 100 | | | 17 | 34 | 17 | 3 | 33 | 266 | 100 | 240 |
| Example 11 | 100 | | | 57 | 19 | 9 | 4 | 31 | 262 | 90 | 190 |
| Example 12 | 100 | | | 17 | 43 | 9 | 3 | 36 | 272 | 90 | 240 |
| Comp. Example 12 | 100 | | | 12 | 34 | 22 | 3 | 32 | 265 | 150 | 255 |
| Comp. Example 13 | 100 | | | 29 | 34 | 5 | 3 | 34 | 269 | 70 | 250 |
| Comp. Example 14 | | 100 | | 26 | 34 | 9 | 3 | 34 | 223 | 10 | 305 |
| Comp. Example 15 | | | 100 | 26 | 34 | 9 | 3 | 34 | 278 | 200 | 330 |

*Note)
"Number of exfoliations"

1. No 30 μm or larger exfoliations were detected in any of the measurements.
2. For the example compositions, when a sample after the exfoliation test was again subjected to ultrasonic cleaning under the same conditions, scarcely any exfoliations were found to be produced. In contrast, for the comparative example compositions, when a sample was again similarly subjected to ultrasonic cleaning under the same conditions, further exfoliations were found to be produced (in a high case, 30 or more occurred).

As shown in Tables 1 to 3, the liquid crystal polyester resin compositions according to the present invention (Examples 1 to 12) have a melt viscosity in the defined range of the present invention. Consequently, these liquid crystal polyester resin compositions exhibit good moldability. Furthermore, good results were obtained, with a low number of exfoliations, and a high deflection temperature under load and high weld strength.

In contrast, for resin compositions like Comparative Examples 1 to 15 outside the defined range of the present invention, the results showed that at least one of moldability, number of exfoliations, deflection temperature under load, and weld strength was poor.

INDUSTRIAL APPLICABILITY

The resin composition for a camera module and the camera module part obtained from this composition according to the present invention have a high heat resistance, can withstand solder reflow, and have a very low level of exfoliations from this part. Therefore, the resin composition for a camera module and the camera module part obtained from this composition according to the present invention can be utilized in various applications, such as for a lens barrel portion, a mount holder portion, a "CMOS (image sensor) frame," and a "shutter and shutter bobbin portion," each of which can undergo surface mounting, in a mobile phone, laptop computer, digital camera, digital video camera and the like.

The invention claimed is:

1. A liquid crystal polyester resin composition for a camera module, characterized by comprising, based on 100 parts by mass of a liquid crystal polyester, 50 to 110 parts by mass of talc having a number average particle size of 10 to 50 μm, and 2 to 10 parts by mass of carbon black, wherein a deflection temperature under load is 220° C. or more and a melt viscosity at a shear rate of 100 sec$^{-1}$ at 370° C. is 10 to 150 Pa·S.

2. The liquid crystal polyester resin composition according to claim 1, characterized in that a number of exfoliations from a surface of a molded article by injection molding according to the following definition is 200 or less, number of exfoliations=number of particles in 10 mL of pure water having a maximum diameter in the range of 2 μm or more after subjecting 2 cylindrical injection molded articles having a threaded structure with a 0.3 mm pitch and a 0.2 mm groove depth on an inner side of a 7 mm (outer diameter)×6 mm (inner diameter)×4 mm (height) cylinder to ultrasonic cleaning for 30 seconds at a power of 40 kHz and 480 W in 266 mL of pure water.

3. A liquid crystal polyester resin composition for a camera module, characterized by comprising, based on 100 parts by mass of a liquid crystal polyester, 15 to 60 parts by mass of talc having a number average particle size of 10 to 50 μm, 25 to 50 parts by mass of a glass fiber having a number average fiber length of 100 to 200 μm, and 2 to 10 parts by mass of carbon black, wherein a deflection temperature under load is 220° C. or more and a melt viscosity at a shear rate of 100 sec$^{-1}$ at 370° C. is 10 to 100 Pa·S.

4. The liquid crystal polyester resin composition according to claim 3, characterized in that the number of exfoliations from a surface of a molded article by injection molding according to the definition is 280 or less.

5. The liquid crystal polyester resin composition for a camera module according to claim 3, characterized by further comprising, based on 100 parts by mass of the liquid crystal polyester, 6 to 20 parts by mass of titanium oxide.

6. The liquid crystal polyester resin composition according to claim 5, characterized in that the number of exfoliations from a surface of a molded article by injection molding according to the definition is 250 or less.

7. The liquid crystal polyester resin composition according to claim 3, characterized in that a weld strength of a molded article by injection molding is 30 MPa or more.

8. A part for a camera module produced from the liquid crystal polyester resin composition according to claim 1, by injection molding.

9. The liquid crystal polyester resin composition according to claim 4, characterized in that a weld strength of a molded article by injection molding is 30 MPa or more.

10. The liquid crystal polyester resin composition according to claim 5, characterized in that a weld strength of a molded article by injection molding is 30 MPa or more.

11. The liquid crystal polyester resin composition according to claim 6, characterized in that a weld strength of a molded article by injection molding is 30 MPa or more.

12. A part for a camera module produced from the liquid crystal polyester resin composition according to claim 2, by injection molding.

13. A part for a camera module produced from the liquid crystal polyester resin composition according to claim 3, by injection molding.

14. A part for a camera module produced from the liquid crystal polyester resin composition according to claim 4, by injection molding.

15. A part for a camera module produced from the liquid crystal polyester resin composition according to claim 5, by injection molding.

16. A part for a camera module produced from the liquid crystal polyester resin composition according to claim 6, by injection molding.

17. A part for a camera module produced from the liquid crystal polyester resin composition according to claim 7, by injection molding.

* * * * *

UNITED STATES PATENT AND TRADEMARK OFFICE
CERTIFICATE OF CORRECTION

PATENT NO. : 8,192,645 B2
APPLICATION NO. : 12/933967
DATED : June 5, 2012
INVENTOR(S) : Satoshi Murouchi et al.

Page 1 of 1

It is certified that error appears in the above-identified patent and that said Letters Patent is hereby corrected as shown below:

In the Specifications:

Column 17 and 18, TABLE 2, reads as follows:

|  | LCP(parts by mass) | | | Talc(parts by mass) | GF(parts by mass) | | | CB (parts by mass) | Weld Strength | DTUL | Viscosity | Number of Exfoliations |
|---|---|---|---|---|---|---|---|---|---|---|---|---|
|  | A | B | C | A | A | B | C |  | (MPa) | (°C) | Pa·S | (pcs/10ml) |
| Example 4 | 100 | | | 34 | 34 | | | 3 | 35 | 270 | 60 | 260 |
| Example 5 | 100 | | | 34 | | 34 | | 3 | 37 | 270 | 60 | 270 |
| Example 6 | 100 | | | 28 | 41 | | | 3 | 36 | 273 | 55 | 275 |
| Example 7 | 100 | | | 43 | 26 | | | 3 | 33 | 265 | 65 | 230 |
| Comp.Example 6 | 100 | | | | 69 | | | 3 | 47 | 277 | 60 | 365 |
| Comp.Example 7 | 100 | | | 34 | | | 34 | 3 | 40 | 276 | 70 | 320 |
| Comp.Example 8 | 100 | | | 64 | 64 | | | 5 | 34 | 270 | 110 | 295 |
| Comp.Example 9 | 100 | | | 13 | 13 | | | 3 | 29 | 265 | 50 | 290 |
| Comp.Example 10 | 100 | | | 34 | 34 | | | 3 | 35 | 225 | 10 | 320 |
| Comp.Example 11 | 100 | | | 34 | 34 | | | 3 | 35 | 280 | 200 | 355 |

TABLE 2, should read as follows:

|  | LCP(parts by mass) | | | Talc(parts by mass) | GF(parts by mass) | | | CB (parts by mass) | Weld Strength | DTUL | Viscosity | Number of Exfoliations |
|---|---|---|---|---|---|---|---|---|---|---|---|---|
|  | A | B | C | A | A | B | C |  | (MPa) | (°C) | Pa·S | (pcs/10ml) |
| Example 4 | 100 | | | 34 | 34 | | | 3 | 35 | 270 | 60 | 260 |
| Example 5 | 100 | | | 34 | | 34 | | 3 | 37 | 270 | 60 | 270 |
| Example 6 | 100 | | | 28 | 41 | | | 3 | 36 | 273 | 55 | 275 |
| Example 7 | 100 | | | 43 | 26 | | | 3 | 33 | 265 | 65 | 230 |
| Comp.Example 6 | 100 | | | | 69 | | | 3 | 47 | 277 | 60 | 365 |
| Comp.Example 7 | 100 | | | 34 | | | 34 | 3 | 40 | 276 | 70 | 320 |
| Comp.Example 8 | 100 | | | 64 | 64 | | | 5 | 34 | 270 | 110 | 295 |
| Comp.Example 9 | 100 | | | 13 | 13 | | | 3 | 29 | 265 | 50 | 290 |
| Comp.Example 10 | | 100 | | 34 | 34 | | | 3 | 35 | 225 | 10 | 320 |
| Comp.Example 11 | | | 100 | 34 | 34 | | | 3 | 35 | 280 | 200 | 355 |

Signed and Sealed this
Twenty-fifth Day of June, 2013

Teresa Stanek Rea
*Acting Director of the United States Patent and Trademark Office*